United States Patent
Zhang

(10) Patent No.: US 6,687,079 B1
(45) Date of Patent: Feb. 3, 2004

(54) APPARATUS AND METHOD FOR PROVIDING SERVO GAIN LINEARIZATION FOR A MAGNETO-RESISTIVE HEAD

(75) Inventor: John Xiao Zhang, Cupertino, CA (US)

(73) Assignee: Samsung Electronics Co., LTD (KR)

( * ) Notice: Subject to any disclaimer, the term of this patent is extended or adjusted under 35 U.S.C. 154(b) by 0 days.

(21) Appl. No.: 09/415,147

(22) Filed: Oct. 8, 1999

(51) Int. Cl.[7] .............................................. G11B 5/596
(52) U.S. Cl. ........................ 360/77.08; 360/29; 360/39
(58) Field of Search ........................ 360/77.08, 78.14, 360/26, 29, 46

(56) References Cited

U.S. PATENT DOCUMENTS

| | | |
|---|---|---|
| 4,371,902 A | 2/1983 | Baxter et al. |
| 4,539,662 A | 9/1985 | Hatano et al. |
| 4,802,033 A | 1/1989 | Chi |
| 4,811,135 A | 3/1989 | Janz |
| 4,823,212 A | 4/1989 | Knowles et al. |
| 4,890,172 A | 12/1989 | Watt et al. |
| 4,937,689 A | 6/1990 | Seaver et al. |
| 4,977,472 A | 12/1990 | Volz et al. |
| 4,982,295 A | 1/1991 | Yakuwa et al. |
| 5,036,408 A | 7/1991 | Leis et al. |
| 5,050,146 A | 9/1991 | Richgels et al. |
| 5,053,899 A | 10/1991 | Okawa et al. |
| 5,182,684 A | 1/1993 | Thomas et al. |
| 5,210,662 A | 5/1993 | Nishijima |
| 5,235,478 A | 8/1993 | Hoshimi et al. |
| 5,255,136 A | 10/1993 | Machado et al. |
| 5,291,110 A | 3/1994 | Andrews, Jr. et al. |
| 5,333,140 A | 7/1994 | Moraru et al. |
| 5,388,010 A * | 2/1995 | Norton, Jr. ................... 360/46 |
| 5,408,367 A | 4/1995 | Emo |
| 5,448,429 A | 9/1995 | Cribbs et al. |
| 5,450,249 A | 9/1995 | Nagaraj et al. |
| 5,452,285 A | 9/1995 | Monen |
| 5,453,887 A | 9/1995 | Negishi et al. |
| 5,465,034 A | 11/1995 | Andrews, Jr. et al. |
| 5,465,035 A | 11/1995 | Scaramuzzo, Jr. et al. |
| 5,500,776 A | 3/1996 | Smith |
| 5,523,902 A | 6/1996 | Pederson |
| 5,570,247 A | 10/1996 | Brown et al. |
| 5,581,420 A | 12/1996 | Chainer et al. |
| 5,587,850 A * | 12/1996 | Ton-that ................... 360/77.08 |
| 5,600,506 A | 2/1997 | Baum et al. |
| 5,602,693 A * | 2/1997 | Brunnett et al. ......... 360/77.08 |
| 5,606,469 A | 2/1997 | Kosugi et al. |
| 5,608,587 A | 3/1997 | Smith |

(List continued on next page.)

FOREIGN PATENT DOCUMENTS

| | | |
|---|---|---|
| EP | 0 601 855 A3 | 6/1994 |
| EP | 0 663 766 A1 | 7/1995 |
| EP | 0 717 559 A2 | 6/1996 |
| EP | 0 718 827 A2 | 6/1996 |
| GB | 2 285 165 A | 6/1995 |
| GB | 2 307 089 A | 5/1997 |
| GB | 2 308 488 A | 6/1997 |
| WO | WO 95/24035 | 9/1995 |
| WO | WO 96/23305 | 8/1996 |

*Primary Examiner*—Andrew L. Sniezek
*Assistant Examiner*—K. Wong
(74) *Attorney, Agent, or Firm*—Irell & Manella LLP; Jeffrey P. Aiello

(57) ABSTRACT

A method and apparatus for generating a position information signal for the head of a hard disk drive. The disk has a track which contains a plurality of servo bursts that allow the head to be centered with the centerline of the track. The servo bursts are first sensed and an upper and a lower threshold values, based on the values of servo bursts, are generated. A position error signal based on the upper and lower threshold and the values of the servo bursts are generated and stored in a memory device.

18 Claims, 11 Drawing Sheets

U.S. PATENT DOCUMENTS

| | | | |
|---|---|---|---|
| 5,615,058 A | 3/1997 | Chainer et al. | |
| 5,631,783 A | 5/1997 | Park | |
| 5,640,423 A | 6/1997 | Archer | |
| 5,657,179 A | 8/1997 | McKenzie | |
| 5,659,436 A | 8/1997 | Yarmchuk et al. | |
| 5,666,238 A | 9/1997 | Igari et al. | |
| 5,680,270 A | 10/1997 | Nakamura | |
| 5,680,451 A | 10/1997 | Betts et al. | |
| 5,691,857 A | 11/1997 | Fitzpatrick et al. | |
| 5,696,647 A | 12/1997 | Phan et al. | |
| 5,710,677 A | 1/1998 | Teng et al. | |
| 5,715,105 A | 2/1998 | Katayama et al. | |
| 5,726,823 A * | 3/1998 | Kisaka et al. | 360/77.08 |
| 5,734,680 A | 3/1998 | Moore et al. | |
| 5,748,677 A | 5/1998 | Kumar | |
| 5,751,513 A | 5/1998 | Phan et al. | |
| 5,760,992 A | 6/1998 | Phan et al. | |
| 5,771,126 A | 6/1998 | Choi | |
| 5,771,130 A | 6/1998 | Baker | |
| 5,771,131 A | 6/1998 | Pirzadeh | |
| 5,796,543 A | 8/1998 | Ton-That | |
| 5,798,883 A | 8/1998 | Kim | |
| 5,825,580 A * | 10/1998 | Shibata | 360/77.08 |
| 5,867,337 A | 2/1999 | Shimomura | |
| 5,867,353 A | 2/1999 | Valent | |
| 5,892,634 A | 4/1999 | Ito et al. | |
| 5,901,009 A | 5/1999 | Sri-Jayantha et al. | |
| 5,917,670 A | 6/1999 | Scaramuzzo et al. | |
| 5,946,157 A | 8/1999 | Codilian et al. | |
| 5,986,847 A * | 11/1999 | Le et al. | 360/78.14 |
| 6,031,684 A | 2/2000 | Gregg | |
| 6,057,977 A * | 5/2000 | Cunningham | 360/77.08 |
| 6,118,616 A | 9/2000 | Jeong | |
| 6,178,060 B1 | 1/2001 | Liu | |
| 6,388,829 B1 * | 5/2002 | Nararian | 360/48 |

\* cited by examiner

Figure 7B.1

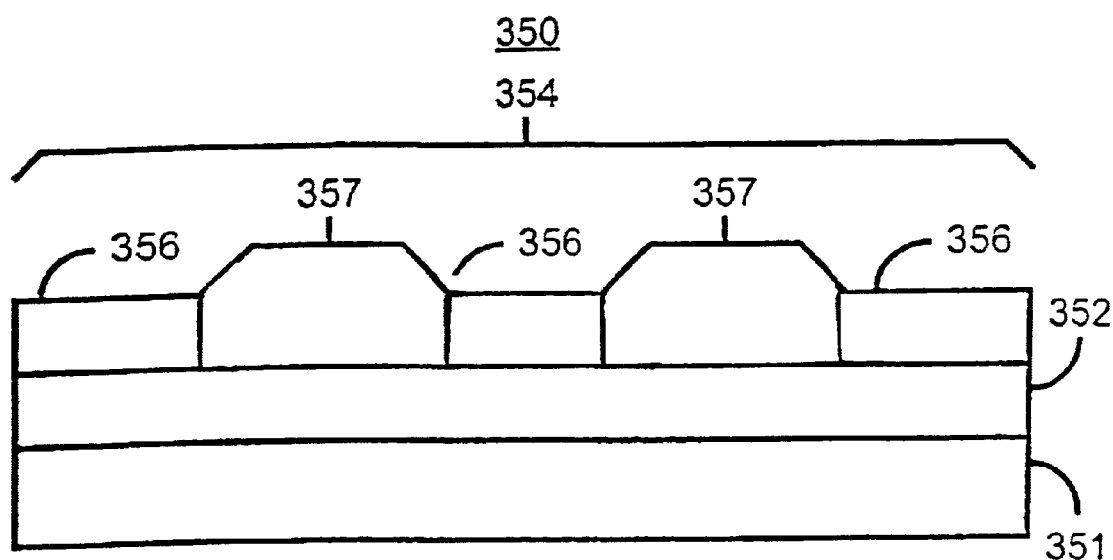
Figure 7B.2

APPARATUS AND METHOD FOR PROVIDING SERVO GAIN LINEARIZATION FOR A MAGNETO-RESISTIVE HEAD

BACKGROUND OF THE INVENTION

1. Field of the Invention

The present invention relates in general to disk storage system and more particularly, to an apparatus and method for generating servo information so as to provide gain linearization for positioning the read head of a hard disk drive.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms, which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately distributed evenly on each track. The raw signals produced by the servo bits are typically demodulated into a position signal which is utilized to determine the position of the head relative to the track, and to move the actuator arm if the head is not located on the track centerline.

Dual element transducers have been utilized in hard disk drives because they have greater aerial densities than signal element transducers. Dual element transducers include a single write element and a separate read element, which is constructed from a magneto-resistive material. Such dual element transducers are commonly referred to as magneto-resistive (MR) heads. Because the centerline of read head is different from the centerline of write head, an adjustment of read/write head position in track width is needed to cope with reading and writing separately. This sub-track position information becomes important to obtain reliable reading and writing. However, in most disk drives, the actual variation of the servo burst signals with respect to the track position for a MR head is non-monotonic and non-linear in nature and varies greatly between different heads.

FIG. 1A is a graph illustrating the variation of the servo burst signals A, B, C, D with respect to the position of the read head of a disk drive under near-ideal conditions. FIG. 1B is a graph illustrating the variation of the difference between servo burst signals (A–B) and (C–D) with respect to the position of the read head of a disk drive under near-ideal conditions. FIG. 1C is a graph illustrating the variation of the difference between (A–B)–(C–D) and (A–B)+(C–D) with respect to the position of the read head of a disk drive based on (A–B) and (C–D). FIGS. 1A to 1C illustrate the servo burst signal based on three typical techniques used to provide correlational information between the amplitude of the position error signal and the distance between the head and center of the track.

In above cases, each of the servo burst signals used varies monotonically with the track position of the read head. Although such monotonic variation permits the servo system to correct the off-track position of the read head, the useful linear range of the servo signal is limited in each case. For example, in FIG. 1A, the portion of the servo signal beyond +/–10% off the track centerline, is non-linear. One solution to this problem is to combine the user of the linear portions of two servo signals while the read head is over one particular track. For example, the linear portions or segments of the (C–D), the (A–B) and the (A–B)–(C–D) signals (as shown in FIG. 1B) or the linear portions of the (A–B)+(C–D) and the (A–B)–(C–D) signals (as shown in FIG. 1C) are relied upon to provide a sufficiently wide linear range for generating servo information over a single track. However, as shown in FIGS. 1B and 1C, the linear segments are not continuous. As a result, there are certain regions in which no servo information is available. In addition, for systems that rely on the use of a combination of the (A–B), (C–D), (A–B)+(C–D) and (A–B)–(C–D) signals (for example, as shown in FIG. 2D), the slope $\beta$ for the (A–B) signal in FIG. 2D is typically different from the slope $\alpha$ for the (A–B)+(C–D). As a result, for systems that rely on such use of combination servo information, the resulting positioning information from one linear segment is inconsistent with that from another linear segment.

In addition, the ratio of the read head width with respect to track width is a significant factor in providing a linear range of burst signals. FIG. 2A is a graph illustrating the variation of A, B, C and D Burst provided using a narrow read head while FIG. 2B is a graph illustrating the variation of (A–B), (C–D), (A–B)+(C–D) and (A–B)–(C–D) provided using narrow read head. Such narrow read heads typically have a read head width to track width ratio, x, of less than 0.5. As shown in FIGS. 2A and 2B, the use of narrow read heads, while providing relatively linear servo signals, also result in the existence of a dead zone, in which servo signal outputs are unavailable. In addition, it takes a longer time for a narrow read head to read the servo bursts and also for the read head to settle if the servo bursts are read using a narrower head. FIG. 2C is a graph illustrating the variation of A, B, C and D Burst with a near-normal actual read head, while FIG. 2D is a graph illustrating the variation of (A–B), (C–D), (A–B)+(C–D) and (A–B)–(C–D) with respect to a near-normal (non-narrow) and actual read head. Such non-narrow read heads typically have a read head width to track width ratio x of greater than 0.5. As shown in FIGS. 2C and 2D, the use of such near-normal heads typically results in providing servo signal bursts having different slopes $\alpha$ and $\beta$. In particular, the slope $\alpha$ is determined by the distance from X to Y, which varies with ratio of the head width to track width. The slope $\beta$ is similarly determined. Thus, if the tolerances for the head dimensions are not strictly met, it will result in variations of not in the servo signal linearity but also in the slope consistency from signal to signal.

Accordingly, there is a need in the technology for overcoming the above described problems so as to reduce the manufacturing cost of read heads through relaxation of head dimension tolerances and also to provide servo information which varies linearly with respect to the track position of the MR read head.

BRIEF SUMMARY OF THE INVENTION

A method and apparatus for generating a position information signal for the head of a hard disk drive. The disk has a track which contains a plurality of servo bursts that allow the head to be centered with the centerline of the track. The servo bursts are first sensed and an upper and a lower threshold values, based on the values of servo bursts, are generated. A position error signal based on the upper and lower threshold and the values of the servo bursts are generated and stored in a memory device.

BRIEF DESCRIPTION OF THE DRAWINGS

FIG. 1C is a graph illustrating the variation of the difference between servo burst signals (A–B)+(C–D) and (A–B)–(C–D) with respect to the position of the read head of a disk drive under near-ideal conditions, as used in the prior art.

DETAILED DESCRIPTION OF THE INVENTION

The present invention utilizes information obtained from equal points of burst readings to obtain thresholds for generating servo information so as to reduce the head costs through relaxation of head dimension tolerance and to provide gain linearization for positioning the read head of a hard disk drive. These equal points of A and C or B and D provides constant linear position information from drive to drive and head to head.

Figure 1A:
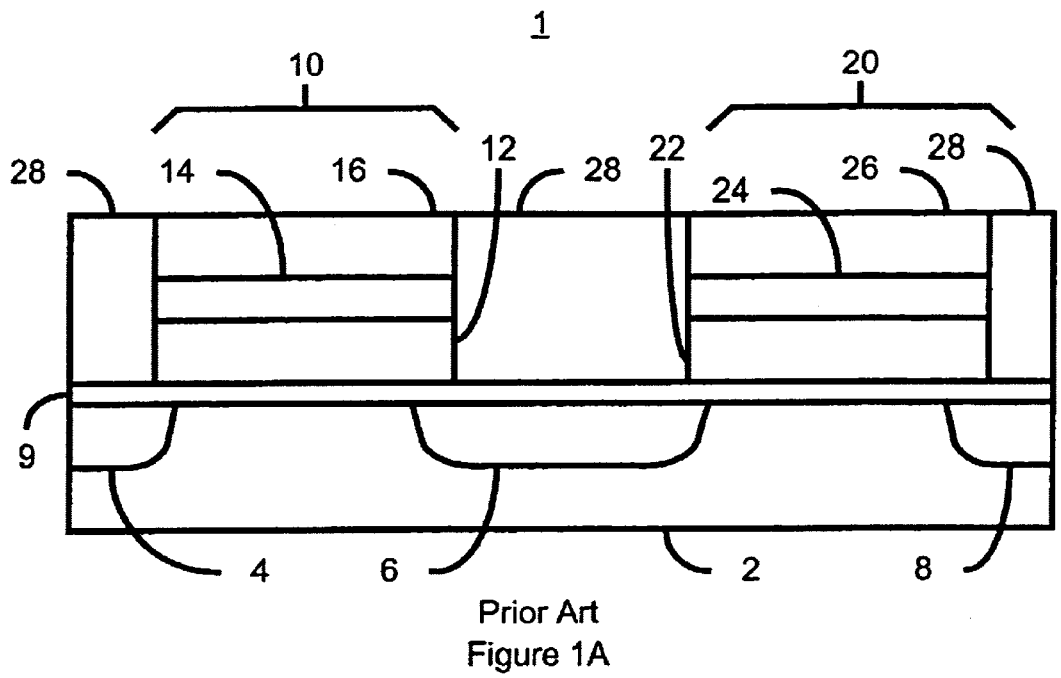
FIG. 1A is a graph illustrating the variation of the servo burst signals A, B, C, D with respect to the position of the read head of a disk drive under near-ideal conditions, as used in the prior art. The track center-lines and boundaries are marked in it.
Figure 1B:
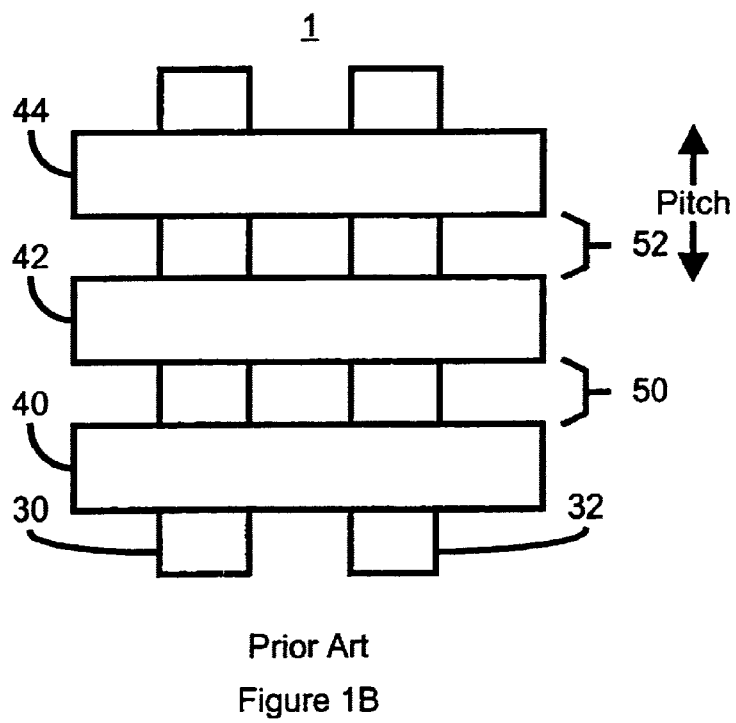
FIG. 1B is a graph illustrating the variation of the difference between servo burst signals (A–B) and (C–D) with respect to the position of the read head of a disk drive under near-ideal conditions, as used in the prior art.
Figure 2:
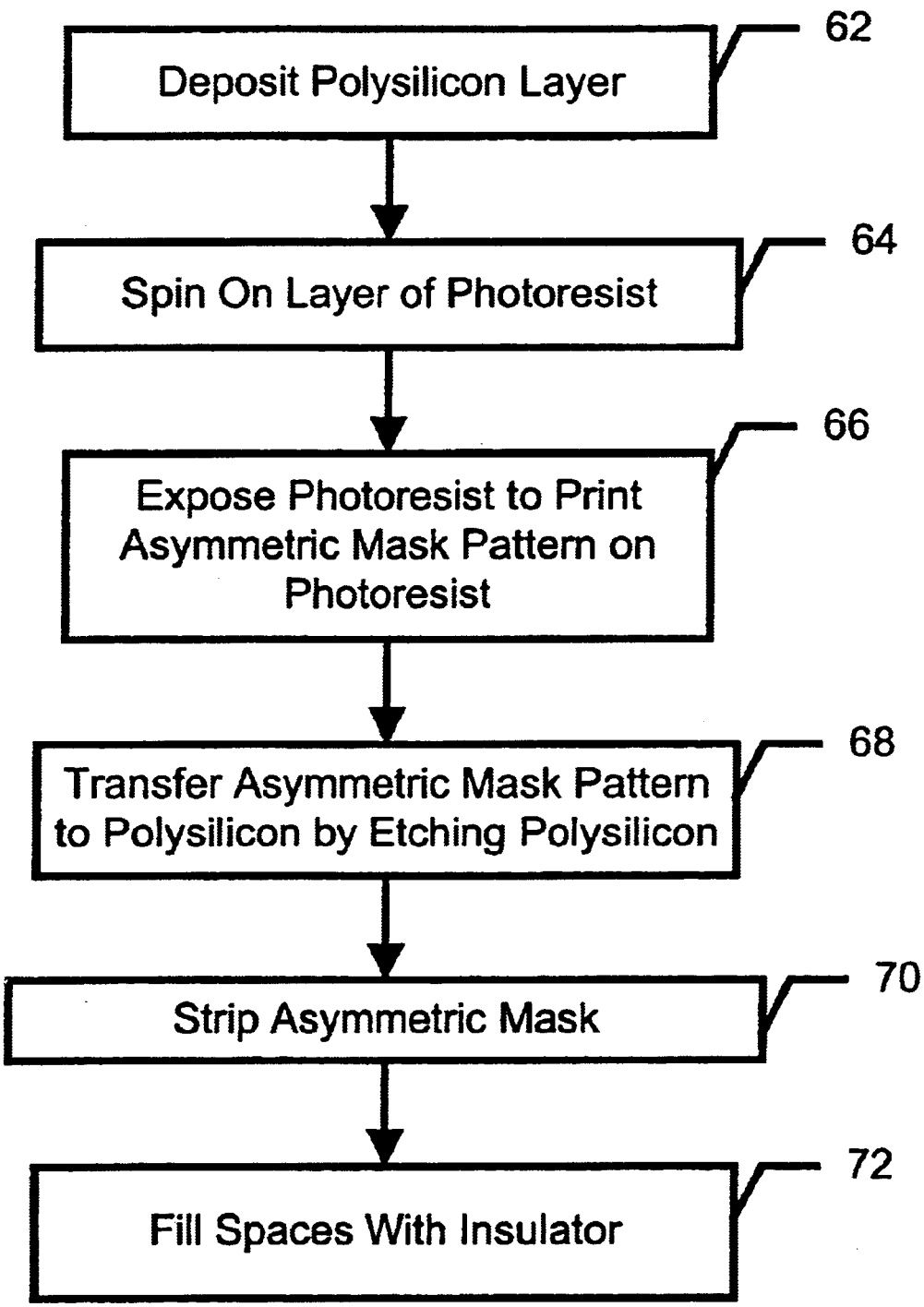
FIG. 2A is a graph illustrating the variation of A, B, C and D Burst provided using a narrow read head, where the head width is less than 50% of track width.
FIG. 2B is a graph illustrating the variation of A–B, C–D, (A–B)+(C–D) and (A–B)–(C–D) provided using a narrow read head, which results in the existence of a dead zone.
FIG. 2C is a graph illustrating the variation of A, B, C and D Bursts provided using a near-normal and actual read head.
FIG. 2D is a graph illustrating the variation of A–B, C–D, (A–B)+(C–D) and (A–B)–(C–D) provided using a near-normal and actual read head. There is a slope difference between (A–B), (C–D) and (A–B)+(C–D), (A–B)–(C–D).
Figure 3A:
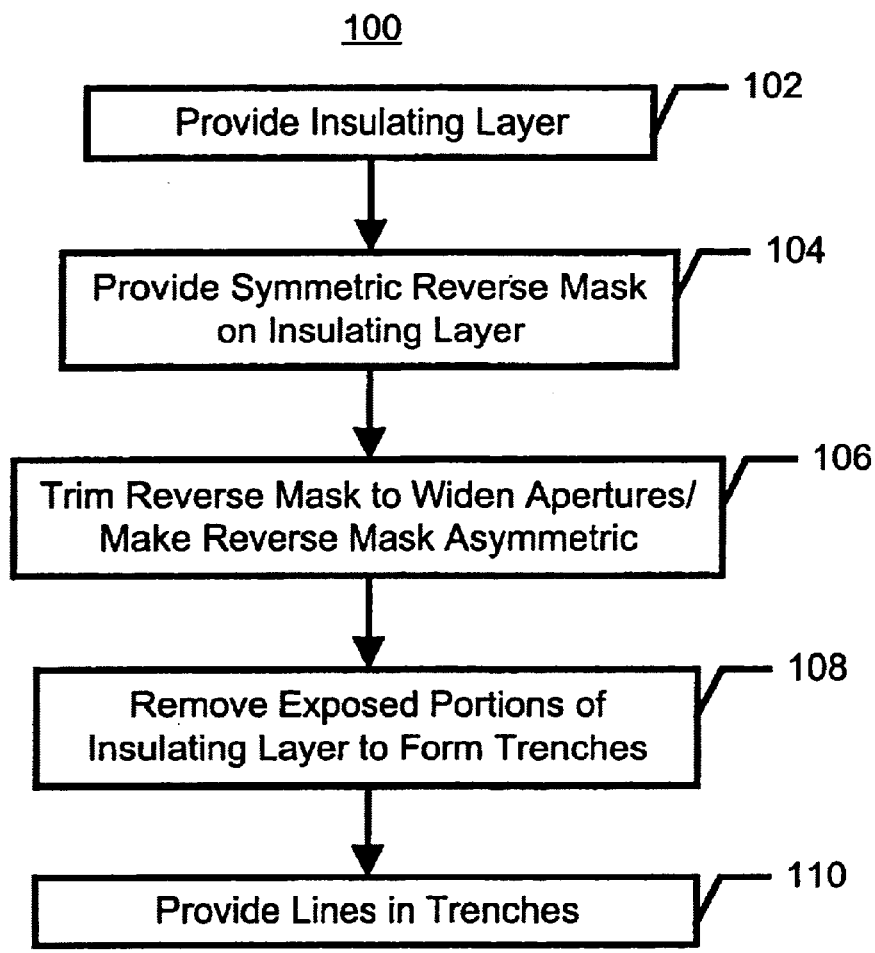
FIG. 3 illustrates a hard disk drive, which utilizes the method of the present invention.
Figure 3B:
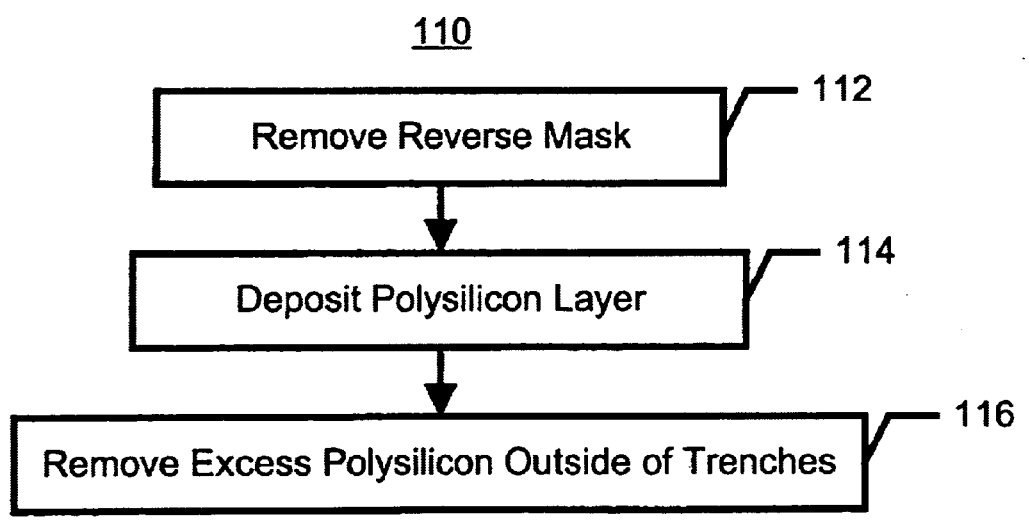
Figure 4A:
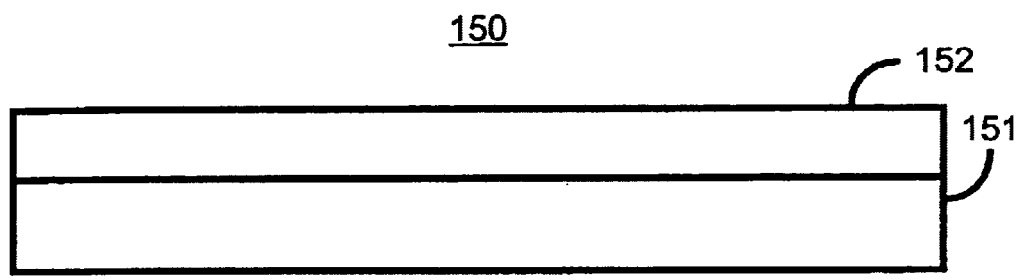
FIG. 4 is a block diagram of portions of an integrated circuit read channel provided in accordance with the present invention.
Figure 4B:
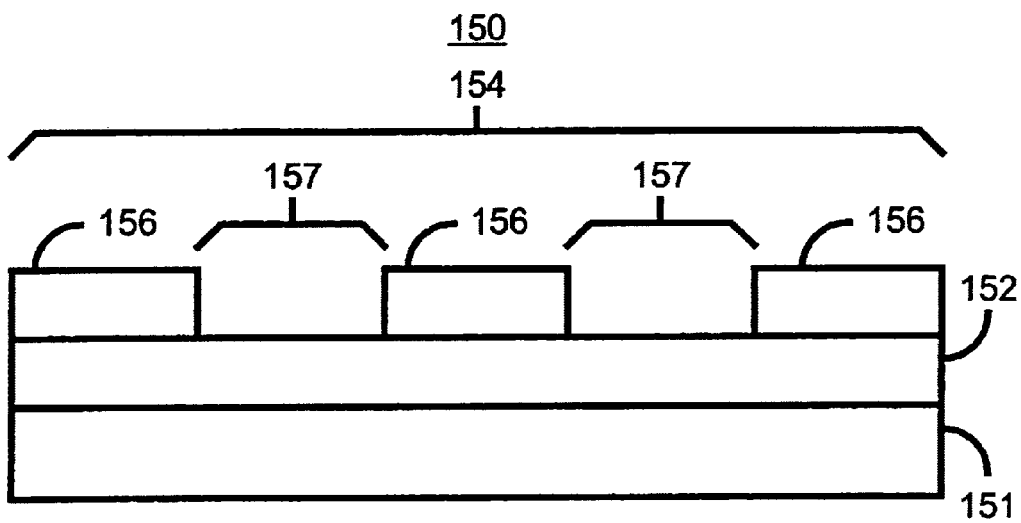
Figure 4C:
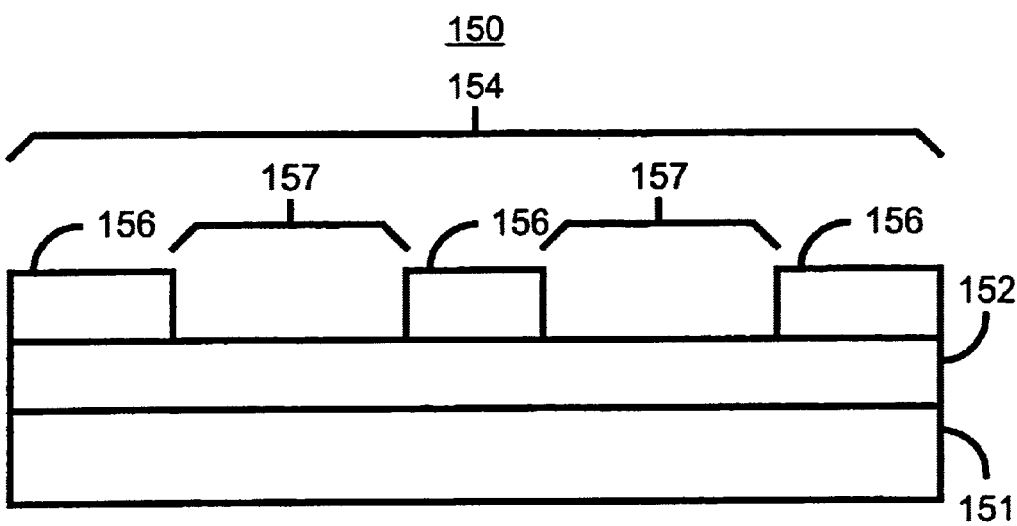
Figure 4D:
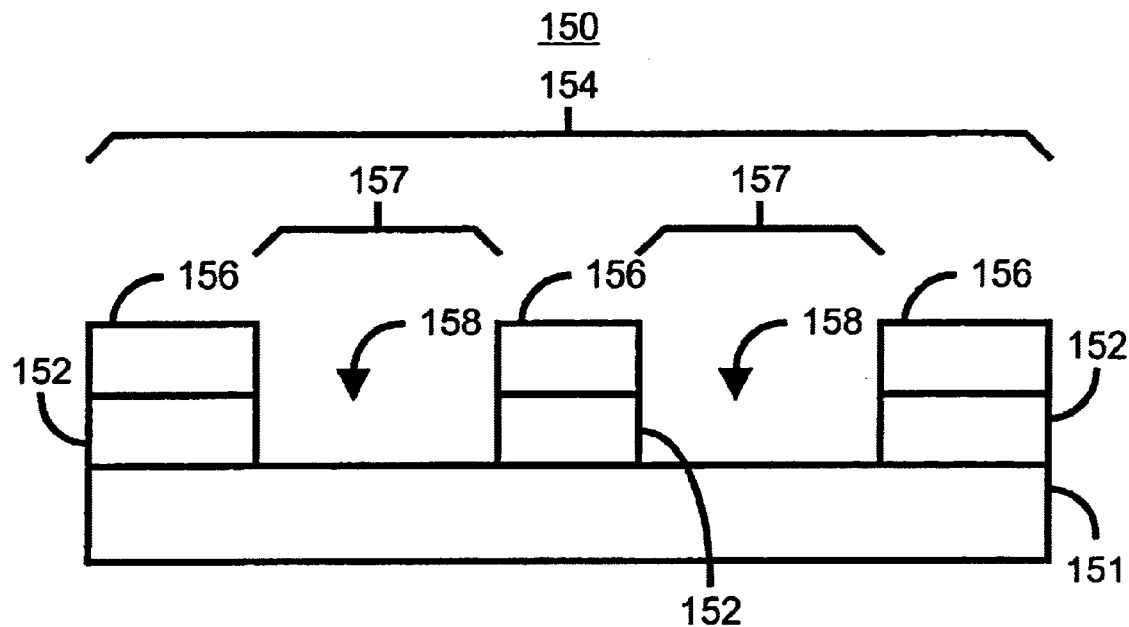
Figure 4E:
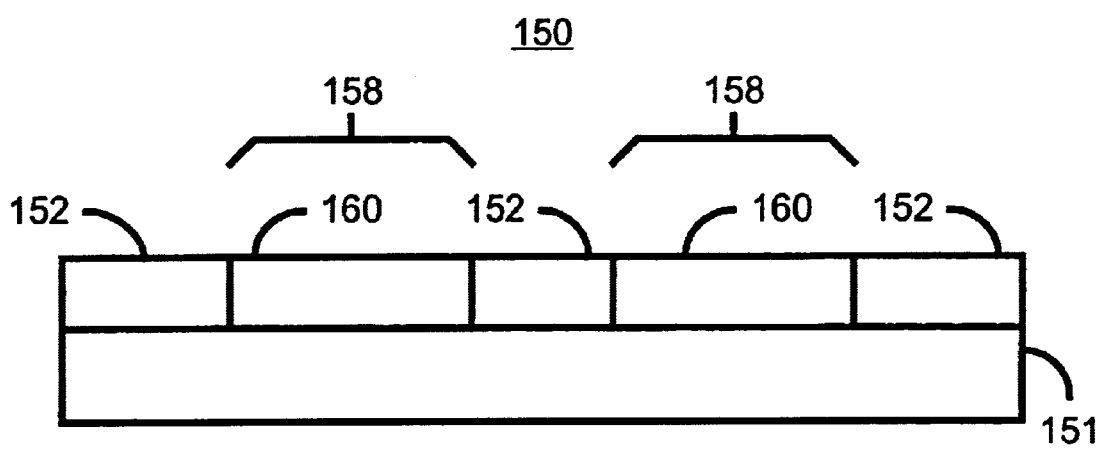

FIG. 3 shows the hard disk drive used in present invention. The disk drive includes a disk pack 100 with a plurality of disks 102 that are collectively rotated by a spin motor 104. The spin motor 104 is mounted to a base plate 106. Also mounted to the base plate 106 is an actuator arm assembly 108. The actuator arm assembly 108 includes a number of read/write heads 110a–d mounted to correspond flexure arms 112. The flexure arms 112 are attached to an actuator arm 114 that can rotate about a bearing assembly 116. The assembly 108 also contains a voice coil motor 118, which moves the heads 110a–d collectively relative to the disks 102. There is typically a single head for each disk surface. The spin motor 104, voice coil 118 and the heads 110 are coupled to a number of electronic circuits 120 mounted to a printed circuit board 122. In the following discussion, only one head 110 is referenced. The electronic circuits 120 typically include a read channel circuit, a microprocessor-based controller and a random access memory (RAM) device.

FIG. 4 is a block diagram of an electronic circuit 120 of the drive. The electronic circuit 120 includes a preamplifier 122, which is coupled to a read/write (R/W) channel circuit 124. The R/W channel circuit 124 includes a R/W Automatic Gain control (AGC), a filter circuit 126, a fullwave rectifier 128 and a peak detector 130. The electronic circuit 120 further comprises a microprocessor-based servo controller 132 which includes an analog-to digital converter (ADC) 134, a digital signal processor (DSP) 136, a burst sequencer and timing circuit 138 and a memory 140, such as a random access memory (RAM) device.

Figure 6A:
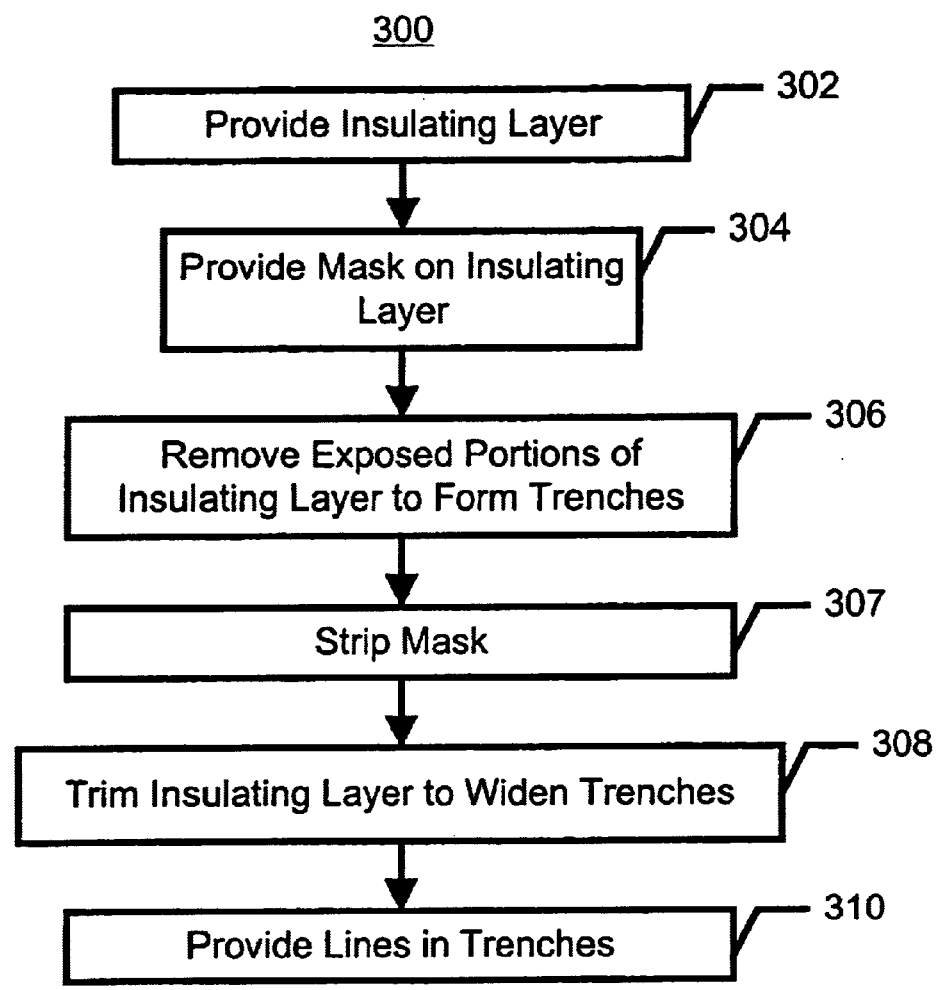
FIG. 6A is a graph illustrating the variation of A, B, C, D servo burst signals and the thresholds provided in accordance with the principles of the invention
Figure 6B:
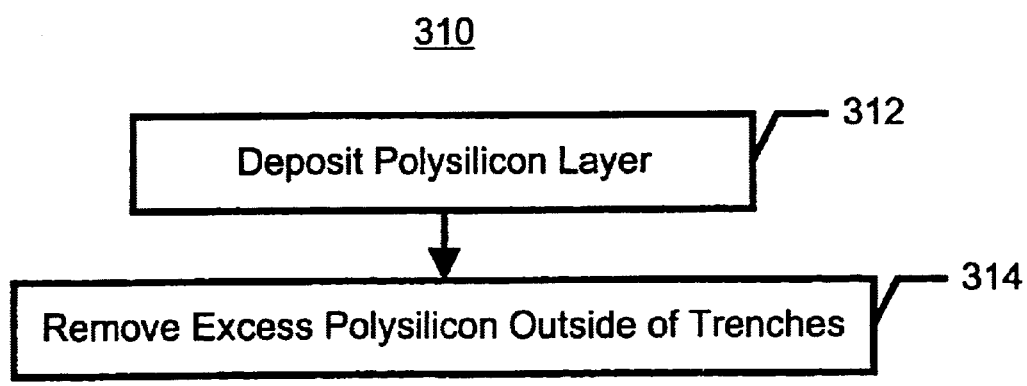
FIG. 6B is a graph illustration the resulting A, B, C and D servo burst signals upon applying the thresholds in accordance with the principles of the invention.
Figure 6C:
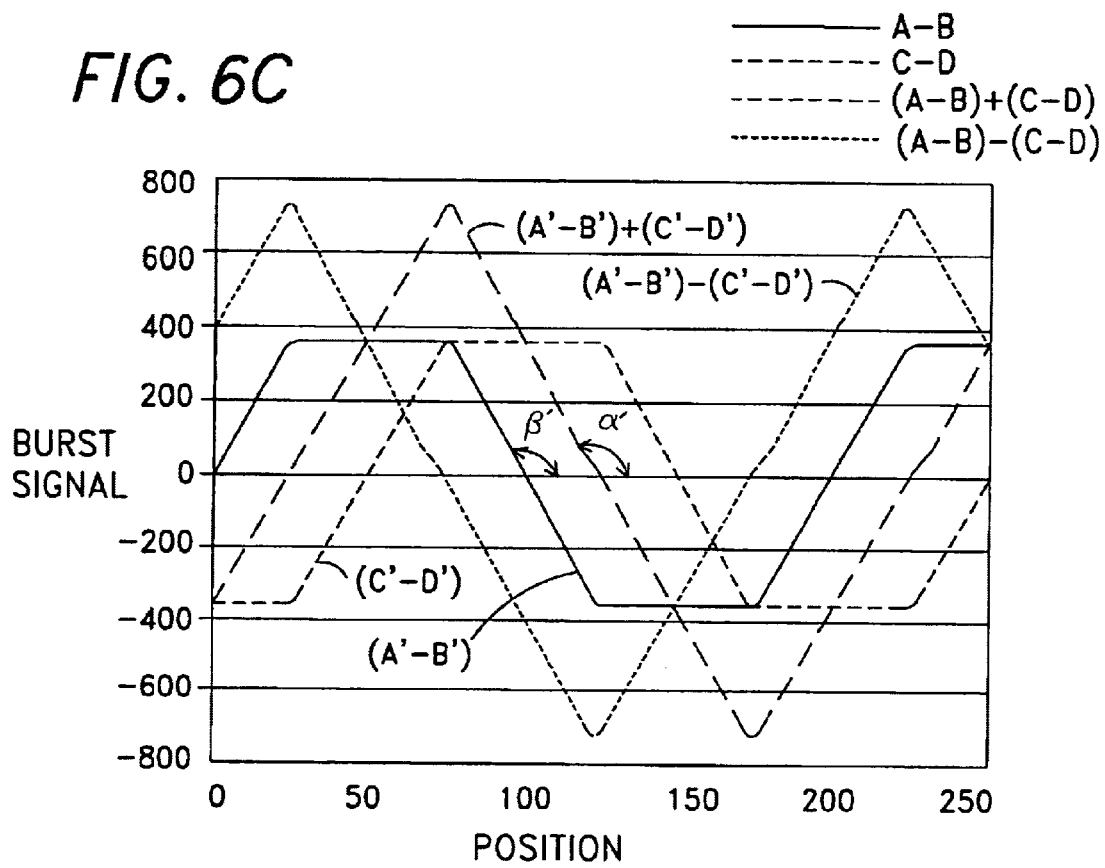
FIG. 6C is a graph illustrating the variation of the (A–B), (C–D), (A–B)+(C–D) and (A–B)–(C–D) signals upon applying thresholds in accordance with the principles of the invention.
Figure 7A:
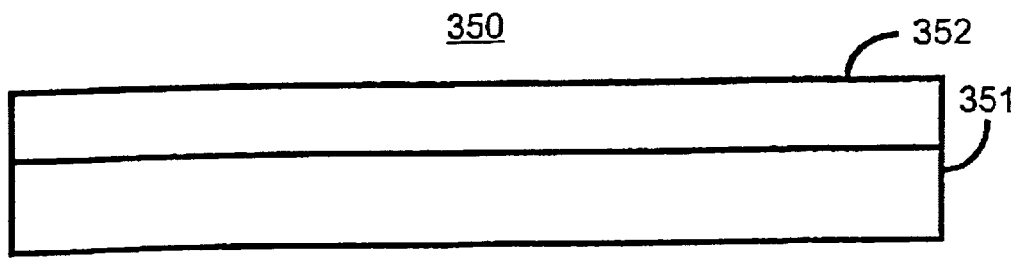
FIG. 7 is a flow chart illustrating the threshold implementation process for each head in each zone.
Figure 7C:
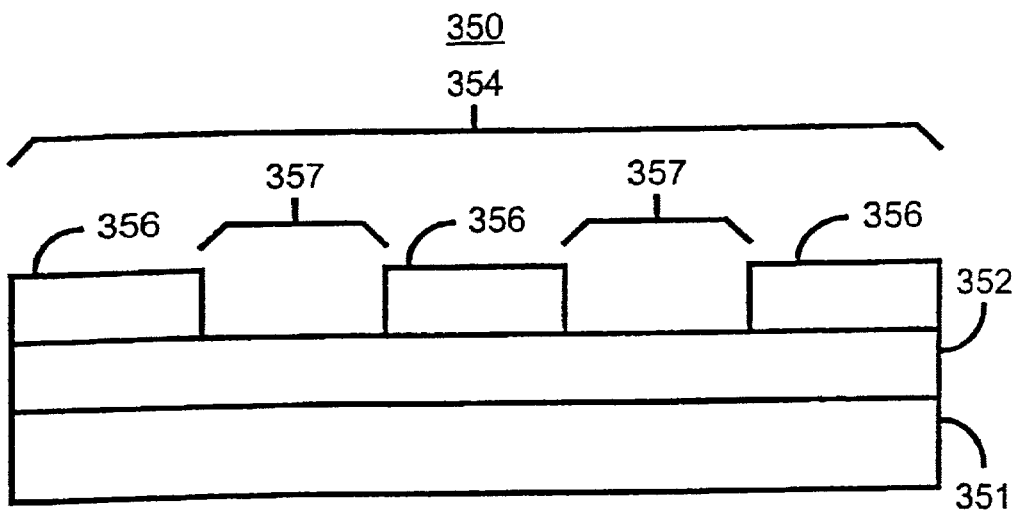
Figure 7C:
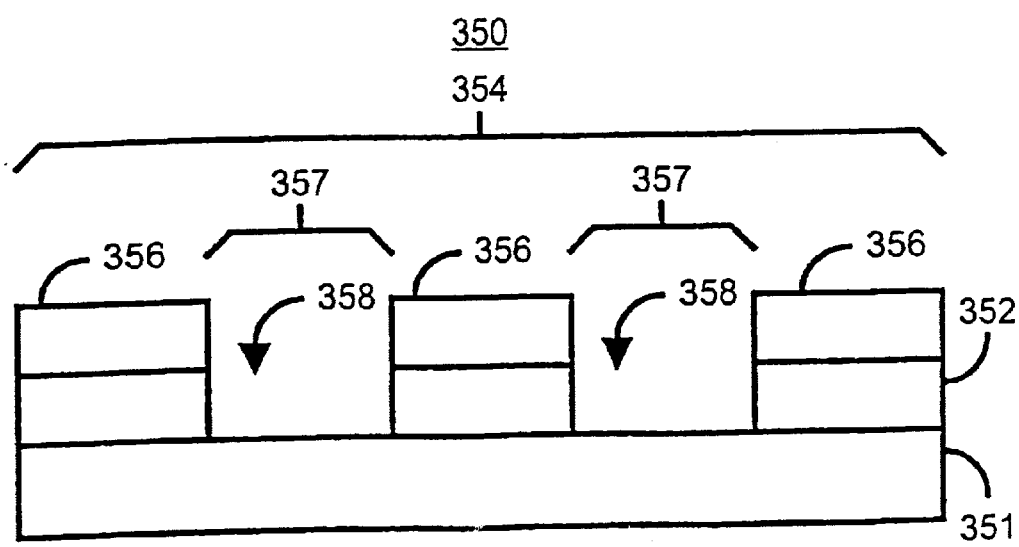
Figure 7D:
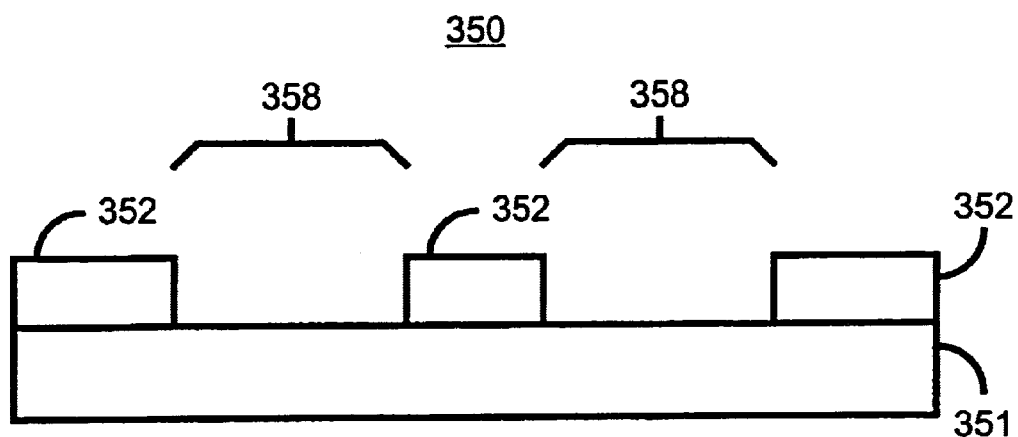
Figure 7E:
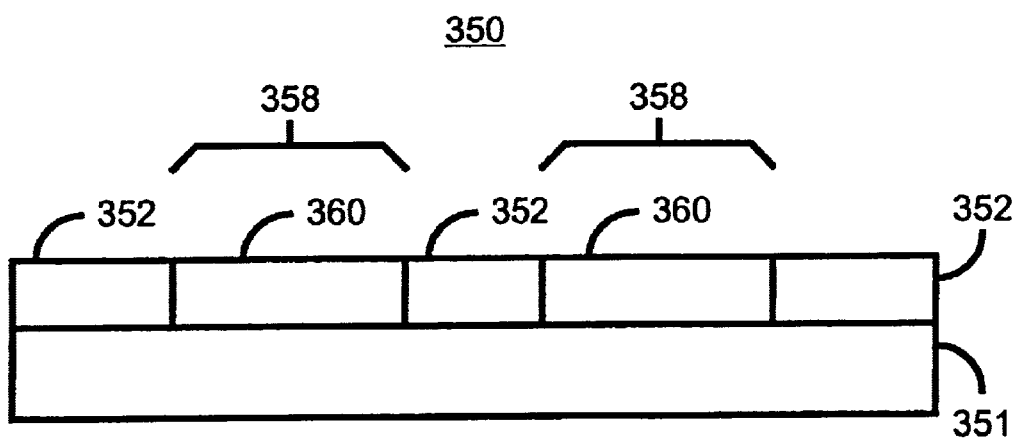

The electronic circuit 120 is coupled to one of the magnetic heads 110, which senses the magnetic field of a magnetic disk 102. When reading the servo information located in the servo field region 10 on the disk 102, the head 110 generates a read signal that corresponds to the magnetic field of the disk 102. The read signal is first amplified by the pre-amplifier 122, and then provided to the R/W channel circuit 124. The AGC data included in the read signal is provided to the R/W AGC and filter circuit 126. The R/W AGC circuit in circuit 126 monitors the AGC data provided by the read signal and the read signal is then filtered by the filter circuit located in the R/W AGC and filter circuit 126. The fullwave rectifier 128 rectifies the read signal and provides the rectified read signal to the peak detector 130. The peak detector 130 detects the amplitude of the read signal. The read signal is then provided to the ADC 134, which provides digitized samples of the analog read signal. The digitized signal is then provided to a digital signal processor (DSP) 136, which determines the location of the points A=C and B=D, so as to set the high threshold and the low threshold for each head in each zone. These values are stored in memory 140. In one embodiment, the value of the high and low threshold may be expressed as K+T and K–T, where K is a baseline value and T is the absolute value of the threshold. For example, with reference to FIG. 6A, K is 250, while T is 440–250 and –T is 250–60=190. Once the high and low thresholds are set, the original burst signals A, B, C, D of FIG. 6A, will be limited by the two thresholds to provide A', B', C' and D' signals, as shown in FIG. 6B. These limited signals A', B', C' and D' can then be used to construct the servo signals (A'–B'), (C'–D'), (A'–B')+(C'–D') and (A'–B')–(C'–D') as shown in FIG. 6C. Subsequently, any one set, i.e., of servo signals A', B', C' and D', or (A'–B') and (C'–D'), or (A'–B')+(C'–D') and (A'–B')–(C'–D'), may be used to control the actuator arm assembly 108 to move the heads 110.

Figure 5A:
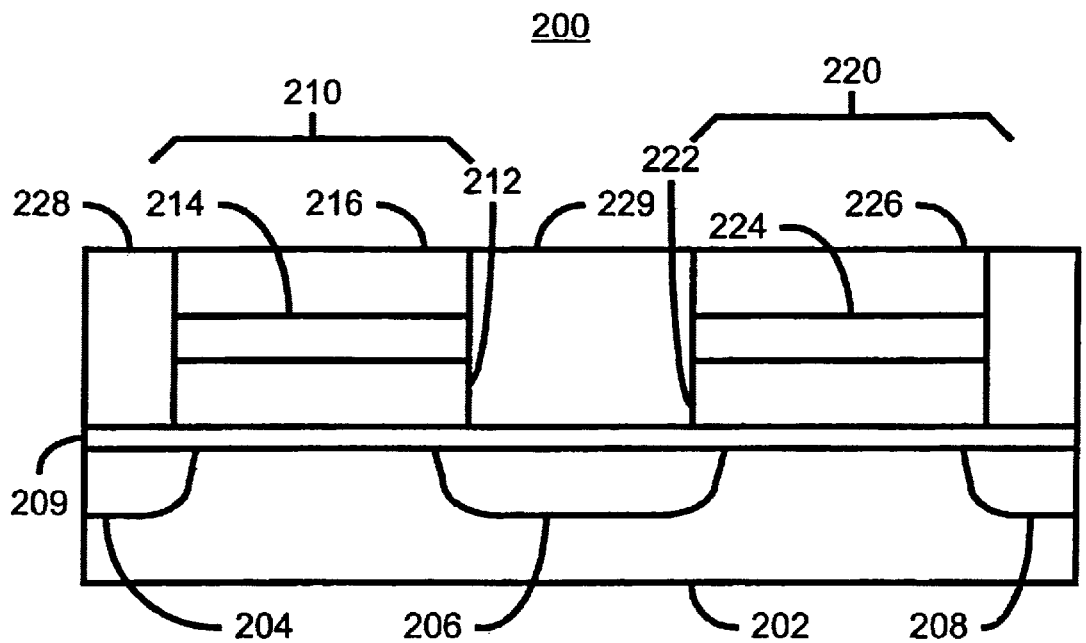
FIG. 5 illustrates the layout of a typical sector of the disk 102.
Figure 5B:
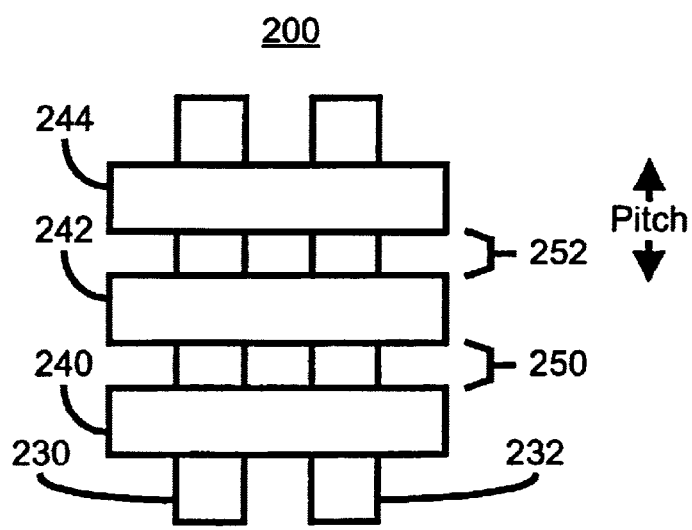

FIG. 5 illustrates the layout of a typical sector in disk drive system. As shown, data is stored within sectors of radially concentric tracks located across the disk 102. A typical sector will have an automatic gain control (AGC) field 150, a synchronization (sync) field 152, a gray code field 154 that identifies the track, an identification (ID) field 156 that defines the sector, a servo field 158 which includes a number of servo bits A, B, C, D, a data field 160 which contains the data and an error correction code field 162. To position the read head, the read head 110 center line is aligned with the track centerline.

The present invention provides an apparatus and method for generating servo information so as to provide gain linearization for positioning the read head of a hard disk drive while facilitating relaxed read head dimension tolerance. The invention also provides servo information that is more consistent from drive to drive and from head to head. Although there are many factors involved in burst signal processing for providing linear position information, two of these are the most important from the servo point of view. The first is the ratio of the read head width over track width. The second is the saturation range of bursts, A, B, C, and D. It has been determined that ratio of the read head width over track width should not be less then 0.5. Otherwise, a dead zone in the burst signal profile results, where no position information output is available. On the other hand, if this ratio is equal to one, the system becomes impractical and inefficient. This ratio x should then be $0.5<x<1.0$. As shown in FIG. 6A, the crossing points of the A and the C burst or the B and D bursts are determined by the read head ratio x and the dynamic range. The present invention locates points to provide a set of thresholds +/−T as shown in FIG. 6A. Once these thresholds are set, the resulting signals (A'−B') and (C'−D'), and (A'−B')+(C'−D') and (A'−B')−(C'−D') that are used to provide servo information, will be linear and constant, as shown in FIG. 6B. In addition, the slope of the signals, $\alpha$ and $\beta$ are equal.

One embodiment of the threshold implementation process provided in accordance with the principles of the invention will now be discussed. The servo burst signals in each track for a particular zone are first read. When the read head crosses each track, the A, B, C and D burst signals are recorded. The burst signal crossing points A=C and B=D in n zones are saved in memory for each head. They are accumulated up to m times, and then averaged.

| Maximum High Threshold Value for A, B, C, D bursts: | | | | | |
|---|---|---|---|---|---|
| | Zone1 | Zone2 | Zone3 | Zone4 | ... ... Zone n |
| Head1 | H11 | H12 | H13 | H14 | ... ... H1n |
| Head2 | H21 | H22 | H23 | H24 | ... ... H2n |
| ... | ... | ... | ... | ... | |
| Head i | Hi1 | Hi2 | Hi3 | Hi4 | ... ... Hi,n |

| Minimum Low Threshold Value for A, B, C, D bursts: | | | | | |
|---|---|---|---|---|---|
| | Zone1 | Zone2 | Zone3 | Zone4 | ... ... Zone n |
| Head1 | L11 | L12 | L13 | L14 | ... ... L1n |
| Head2 | L21 | L22 | L23 | L24 | ... ... L2n |
| ... | ... | ... | ... | ... | |
| Head i | Li1 | Li2 | Li3 | Li4 | ... ... Li,n |

Where: n is zone number, i is head number.

Where: n is zone number, i is head number.

The crossing points of A=C and B=D are used to determine the value of the upper and lower thresholds. Next, the resulting burst signals A', B', C' and D' based on the original burst signals A, B, C and D, as limited by the thresholds, are generated. The A'B'C' and D' signals are then used to calculate the servo signals (A'−C') and (B'−D'), (A'−B')+(C'−D') and (A'−B')−(C'−D'). Using the thresholds to limit the original signals A, B, C, D will result in providing servo signals A', B', C' and D' that are linear and consistent. The resulting position information will also be undistorted.

However, under actual conditions, it is difficult to obtain values that are equal for the crossing points of A=C and B=D due to the existence of noise from various sources. Accordingly, a tolerance may be specified in determining the crossing points of (A−C) and (B−D). Thus, in one embodiment, one may specify that the value of the position error signal $A-C \leq \Delta$ and $B-D \leq \Delta$ with average of these points being used to set the absolute value of the threshold. Such a tolerance may be predetermined by conducting tests. It has been determined that, through the use of an 8-bit analog-to digital converter (ADC) (i.e., for values from 0 to 255), $\Delta$ may be in the range of 10 to 25, with a preferred tolerance of 15 to eliminate noise. In one embodiment, the value of $\Delta$ is less than 10% of the full scale value of the burst signal.

FIG. 7 is a flow chart illustrating one embodiment of the threshold implementation process provided in accordance with the principles of the process 700 proceeds from a start state, which is typically at the beginning of a burst interrupt service routine. The process 700 then proceeds to process block 710 check all relevant flags to determine if this routine has been already performed. If so, the process 700 is bypassed or terminated. If not, the process 700 proceeds to process block 720, where a predetermined zone and head is selected for implementing the process. The process 700 then advances to decision block 730, where it determines if the servo burst value $A-C \leq \Delta$. If so, the process 700 proceeds to decision block 740, where it determines if the current value of A is less than half of the full scale value of A. If so, the process 700 determines that the current value of A is stored in a matrix of Li,n where L is the value of the crossing point of A−C for the ith head and the nth zone as shown in process block 750. The process then proceeds to decision block 770. If, at process block 740, the current value of A is greater than half the full scale value of A, the process 700 proceeds to process block 760, where the current value of A is stored in a matrix of Hi,n where H is the value of the crossing point of A−C for the ith head and the nth zone. The process 700 then proceeds to decision block 770. If at decision block 730, the value of A−C is less than $\Delta$ the process 700 proceeds to process block 770.

At process block 770, the process 700 determines if $B-D \leq \Delta$. If not, the process 700 is terminated. Otherwise, the process 700 proceeds to decision block 740, where it determines if the current value of B is less than half of the full scale value of B. If so, the process 700 determines that the current value of B is stored in a matrix of Li,n where L is the value of the crossing point of A−C for the ith head and the nth zone as shown in process block 790. The process then proceeds to decision block 810. If, at process block 780, the current value of B is greater than half the full scale value of B, the process 700 proceeds to process block 800, where the current value of B is stored in a matrix of Hi,n where H is the value of the crossing point of B−D for the ith head and the nth zone. The process 700 then proceeds to decision block 810, where it determines if it has reached the last count for the current zone. If not, the process 700 returns to decision block 730, otherwise, it proceeds to decision block 820, where it determines if the last zone has been reached. If not, the process 700 proceeds to process block 720. Otherwise, the process 700 proceeds to decision block 830, where it determines if the last head has been reached. If not, the process proceeds to process block 720, otherwise, it proceeds to process block 840, where the flag for the current zone and head is set. The process 700 then terminates.

Through utilization of the method of the present invention, servo information which varies linearly with respect to the track position of a MR read head is provided. The provision of such servo information facilitates linearization of the servo loop gain, which improves the read throughout performance and consequently, reduced head costs and increased product yields.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for providing a position information signal for a hard disk drive, comprising:
   a) providing a disk that has a plurality of tracks, each of said plurality of tracks having a track centerline and a plurality of servo fields, each servo field having an A burst, a B burst, a C burst and a D burst, the A burst and the B burst have a common boundary located at the track centerline and the C burst and the D burst have a common boundary, each of said A, B, C and D bursts providing a corresponding servo burst value;
   b) aligning a read element over the track centerline;
   c) sensing the A, B, C and D bursts;
   d) generating an upper threshold and a lower threshold based on said A, B, C and D servo burst values;
   e) generating A', B', C' and D' servo burst values based on the upper and lower thresholds;
   f) generating a position error signal based on the A', B', C' and D' servo burst values and,
   g) storing said position error signal in a memory device.

2. The method as recited in claim 1, wherein d) comprises:
   d.1) determining if the value of the (A–C) servo burst value is less than a predetermined amount and if the value of the (B–D) servo burst value is less than the predetermined amount;
   d.2) generating an upper threshold and a lower threshold based on the (A–C) and the (B–D) servo burst values.

3. The method of claim 2, wherein said predetermined amount corresponds to a value of a position error signal of a corresponding track that is being sensed.

4. The method of claim 3, wherein said value of said position error signal ratio is less than 10% of a full scale value of the burst signal.

5. The method of claim 1, further comprising:
   generating a set of (A'–C') and (B'–D') servo values; and,
   generating a position error signal based on said set of (A'–C') and (B'–D') servo values.

6. The method of claim 1, further comprising:
   generating a set of [(A'–B')+(C'–D')] and [(A'–B')–(C'–D')] servo values; and,
   generating a position error signal based on said set of [(A'–B')+(C'–D')] and [(A'–B')–(C'–D')] servo values.

7. A hard disk drive, comprising:
   a housing;
   an actuator arm mounted to said housing;
   a head mounted to said actuator arm, said head having a read element;
   a spin motor mounted to said housing;
   a memory device;
   a processor coupled to said head, said actuator arm, said spin motor and said memory device; and,
   a disk attached to said spin motor, said disk that having a plurality of tracks, each of said plurality of tracks having a track centerline and a plurality of servo fields, each servo field having an A burst, a B burst, a C burst and a D burst, the A burst and the B burst have a common boundary located at the track centerline and the C burst and the D burst have a common boundary, each of said A, B, C and D bursts providing a corresponding servo burst value;
   wherein said processor directs said read element over the track centerline to sense the A, B, C and D bursts, said processor generating an upper threshold and a lower threshold based on said A, B, C and D servo burst values, said processor generating A', B', C' and D' servo burst values based on the upper and lower thresholds, said processor further generating a position error signal based on the A', B', C' and D' upper and lower thresholds and the A, B, C and D servo burst values, the storage device to store said position error signal.

8. The hard disk drive as recited in claim 7, wherein in generating an upper threshold and a lower threshold based, said processor:
   1) determines if the value of the (A–C) servo burst value is less than a predetermined amount and if the value of the (B–D) servo burst value is less than the predetermined amount;
   2) generates an upper threshold and a lower threshold based on the (A–C) and the (B–D) servo burst values.

9. The hard disk drive of claim 8, wherein said predetermined amount corresponds to a ratio of a width of the head to a width of a corresponding track that is being sensed.

10. The hard disk drive of claim 9, wherein said ratio is in a range between 0.5 and 1.0.

11. The hard disk drive of claim 7, wherein in generating a position error signal, said processor:
    generates a set of (A'–C') and (B'–D') servo values; and,
    generates a position error signal based on said set of (A'–C') and (B'–D') servo values.

12. The hard disk drive of claim 7, wherein in generating a position error signal, said processor:
    1) generates a set of A', B', C' and D' servo values based on the upper and lower thresholds and the A, B, C and D servo burst values;
    2) generates a set of [(A'–B')+(C'–D')] and [(A'–B')–(C'–D')] servo values;
    3) generates a position error signal based on said set of [(A'–B')+(C'–D')] and [(A'–B')–(C'–D')] servo values.

13. A computer program product, comprising:
    a computer usable medium having computer program code embodied therein to provide a position information signal for a hard disk drive, said hard disk drive having a disk with a plurality of tracks, each of said plurality of tracks having a track centerline and a plurality of servo fields, each servo field having an A burst, a B burst, a C burst and a D burst, the A burst and the B burst have a common boundary located at the track centerline and the C burst and the D burst have a common boundary, each of said A, B, C and D bursts providing a corresponding servo burst value, the computer program product having:
    a) computer readable program code for aligning a read element over the track centerline;

b) computer readable program code for directing the read element to sense the A, B, C and D bursts;
c) computer readable program code for generating an upper threshold and a lower threshold based on said A, B, C and D servo burst values;
d) computer readable program code for generating A', B', C' and D' servo burst values based on the upper and lower thresholds;
e) computer readable program code for generating a position error signal based on the A', B', C' and D' servo burst values and,
f) computer readable program code for storing said position error signal in a memory device.

14. The computer program product as recited in claim 13, wherein c) comprises:
   c.1) computer readable program code for determining if the value of the (A–C) servo burst value is less than a predetermined amount and if the value of the (B–D) servo burst value is less than the predetermined amount;
   c.2) computer readable program code for generating an upper threshold and a lower threshold based on the (A–C) and the (B–D) servo burst values.

15. The computer program product of claim 14, wherein said predetermined amount corresponds to a ratio of a width of the head to a width of a corresponding track that is being sensed.

16. The computer program product of claim 15, wherein said ratio is in a range between 0.5 and 1.0.

17. The computer program product of claim 13, further comprising:
   computer readable program code for generating a set of (A'–C') and (B'–D') servo values; and,
   computer readable program code for generating a position error signal based on said set of (A'–C') and (B'–D') servo values.

18. The computer program product of claim 13, further comprising:
   computer readable program code for generating a set of [(A'–B')+(C'–D')] and [(A'–B')–(C'–D')] servo values; and,
   computer readable program code for generating a position error signal based on said set of [(A'–B')+(C'–D')] and [(A'–B')–(C'–D')] servo values.

* * * * *